United States Patent
Schnoor

(12) 
(10) Patent No.: US 6,370,867 B1
(45) Date of Patent: Apr. 16, 2002

(54) THROTTLEABLE ROCKET INJECTOR ASSEMBLY

(75) Inventor: Richard James Schnoor, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 07/637,845

(22) Filed: Jan. 7, 1991

(51) Int. Cl.[7] .................................................. F02K 9/52
(52) U.S. Cl. .............................. 60/258; 60/240; 60/257; 239/563
(58) Field of Search ........................... 60/258, 257, 240; 239/563

(56) References Cited

U.S. PATENT DOCUMENTS

| | | | | |
|---|---|---|---|---|
| 3,001,365 A | * | 9/1961 | Kellogg ........................ | 60/258 |
| 3,137,130 A | * | 6/1964 | Tinkelenberg ................ | 60/258 |
| 3,462,950 A | * | 8/1969 | Chevalaz ...................... | 60/258 |
| 3,488,951 A | * | 1/1970 | Chamberlain et al. ........ | 60/258 |

\* cited by examiner

*Primary Examiner*—Harold J. Tudor
(74) *Attorney, Agent, or Firm*—Christopher T. Hayes

(57) ABSTRACT

A throttleable rocket injector assembly is disclosed wherein the flow of oxidizer into each of the oxidizer injectors is simultaneously regulated by a mechanical assembly mounted entirely within the oxidizer chamber.

7 Claims, 4 Drawing Sheets

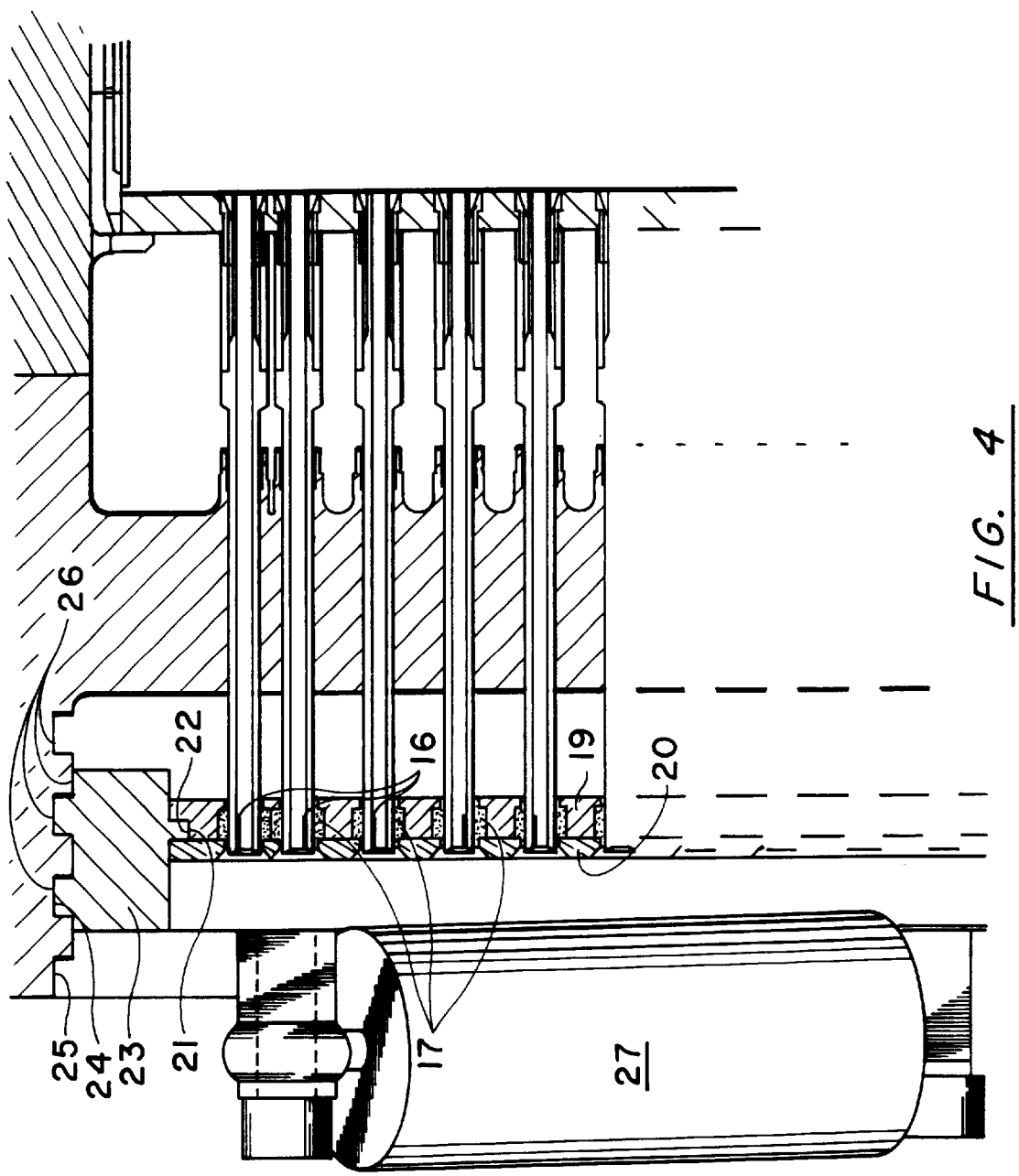

THROTTLEABLE ROCKET INJECTOR ASSEMBLY

FIELD OF THE INVENTION

This invention relates to rocket engines, and particularly to such engines which use an oxidizer to combust a fuel.

BACKGROUND ART

In a typical liquid rocket engine, fuel and oxidizer are introduced into the combustion chamber through injectors. In rocket engines using liquid oxygen (LOX) as the oxidizer, LOX from the LOX tank is piped to the LOX chamber. The LOX chamber includes a plurality of oxidizer injector tubes through which the oxidizer is injected into the combustion chamber.

The flow rate of LOX to the combustion chamber is controlled by a flow regulating valve in the oxidizer line between the LOX tank and the LOX chamber. In order to optimize mixing and combustion of the fuel and oxidizer, oxidizer flow must be modulated in response to changing engine conditions. Unfortunately, due to the lag time between a change in the flow regulating valve position and the change in oxidizer flow through the injector tubes, mixing and combustion could heretofore only be optimized in a step-wise fashion.

What is needed is a throttleable rocket injector assembly which allows fully variable throttling at the oxidizer injector inlets for optimizing, mixing and combustion of the fuel and oxidizer.

DISCLOSURE OF THE INVENTION

It is therefore an object of the present invention to provide a throttleable rocket injector assembly in which oxidizer flow is controlled at the injector inlets.

According to the present invention, a throttleable rocket injector assembly is disclosed in which the inlet to each of the oxidizer injector tubes is an axially extending slot adjacent the upstream end of each injector tube. A sleeve on each injector tube adjacent the inlet slot thereof is axially positionable between a first position in which oxidizer flow into the injector inlet is unobstructed by the sleeve, and a second position in which the sleeve fully obstructs the injector inlet, preventing the flow of oxidizer therethrough. Each of the sleeves is mounted in a flow positioning plate which constrains the sleeves to move axially in unison.

The positioning plate in turn, is axially positionable by a positioning ring which is secured to the positioning plate by a tongue-and-groove arrangement at the outer diameter of the positioning plate. The outer diameter of the positioning ring is threaded to the inside of the LOX chamber by a large pitch or multi-lead thread on the outer diameter of the positioning ring. Actuators mounted to the inside of the LOX chamber and attached to the positioning ring rotate the positioning ring with respect to the LOX chamber.

The positioning ring thus rotates and translates according to the pitch of the positioning ring/LOX chamber threads. However, since the positioning ring is free to rotate with respect to the positioning plate due to the tongue-and-groove attachment therebetween, only the axial translation of the positioning ring is transmitted to the positioning plate and the sleeves mounted therein. This direct control of oxidizer flow into each of the oxidizer inlets allows fully variable throttling of the oxidizer injectors for optimum mixing and combustion of the fuel and oxidizer, eliminating the need for the step-wise optimization of the prior art.

The foregoing and other features and advantages of the present invention will become more apparent from the following description and accompanying drawings.

BRIEF DESCRIPTION OF THE DRAWINGS

FIG. 4 shows a cross-section of the injector assembly of the present invention taken along line 4—4 of FIG. 3.

BEST MODE FOR CARRYING OUT THE INVENTION

Figure 1:
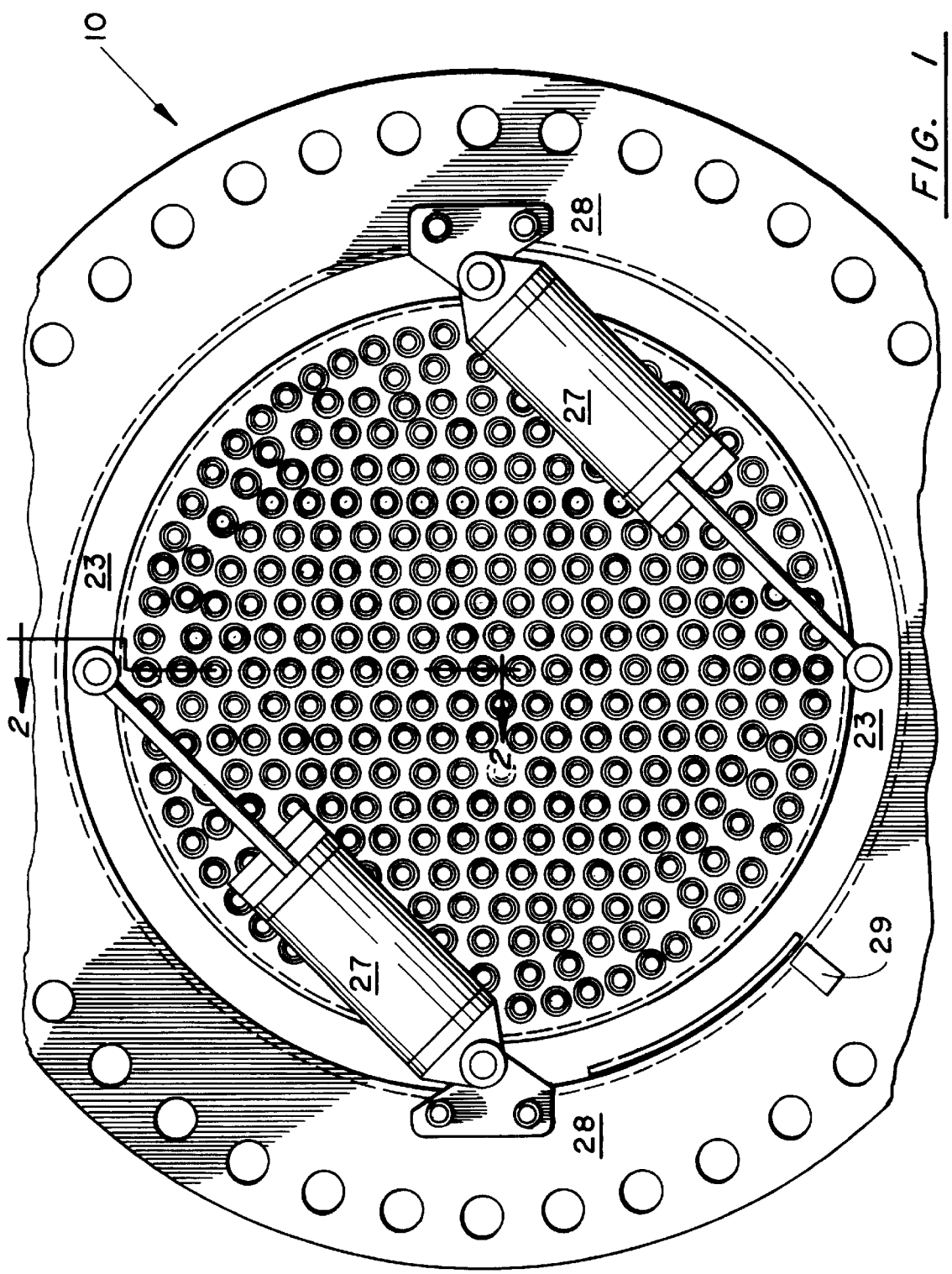
FIG. 1 shows a plan view of the injector assembly of the present invention within the oxidizer chamber.
Figure 2:
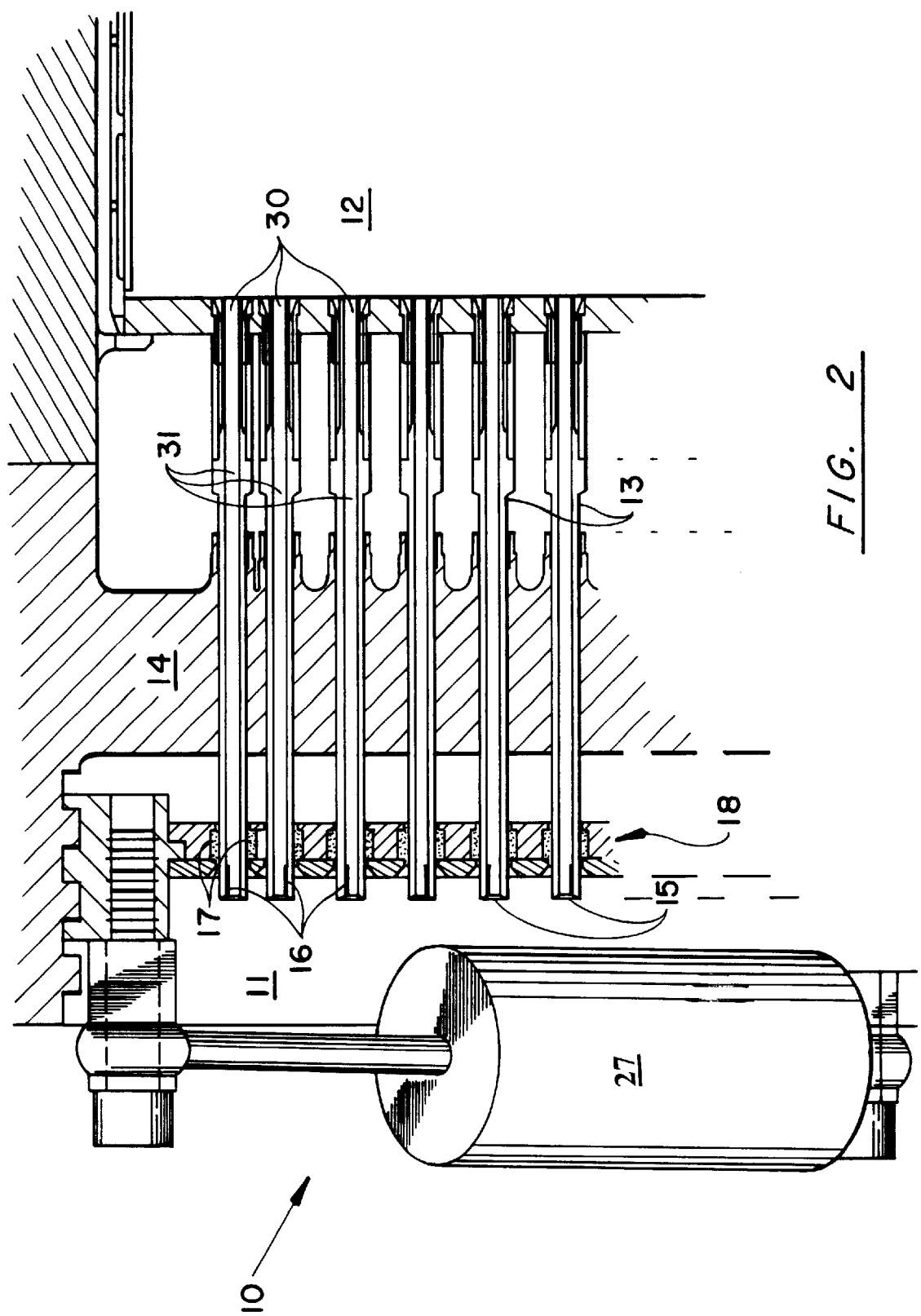
FIG. 2 shows a cross-section of the injector assembly of the present invention taken along line 2—2 of FIG. 1.

FIGS. 1 and 2 show a portion of the throttleable rocket injector 10 assembly of the present invention used to control the flow of oxidizer from the oxidizer chamber 11 to the combustion chamber 12. The injector assembly 10 includes a plurality of injector tubes 13 which extend through the housing 14 of the oxidizer chamber 11 and into the combustion chamber 12. The inlet end 15 of each injector tube 13 is sealed, thereby preventing oxidizer from flowing axially into the injector tubes 13.

Each oxidizer tube 13 includes one or more inlet slots 16 adjacent the inlet end 15 thereof. Each inlet slot 16 extends axially along the injector tube 13 and communicates with an outlet 30 in the combustion chamber 12 through an interior passage 31. Each injector tube 13 includes a sleeve 17 slidably mounted thereon which is axially positionable between a first position in which the sleeve 17 fully covers the inlet slot 16, as shown in FIG. 4, and a second position in which oxidizer flow through the inlet slot 16 is unimpeded by the sleeve 17.

Each of the sleeves 17 is in turn mounted in a circular positioning plate 18 which constrains the sleeves 17 to move in unison axially along the injector tubes 13. The positioning plate 18 preferably includes a first member 19 which receives the sleeves 17 and a second member 20 which attaches to the first member 19 to secure the sleeves 17 therein. At the outer diameter of the positioning plate 18, one or both of the first and second members has an annular channel 21 therein to receive an annular flange 22 extending from the positioning ring 23 in a tongue-and-groove arrangement.

Figure 3:
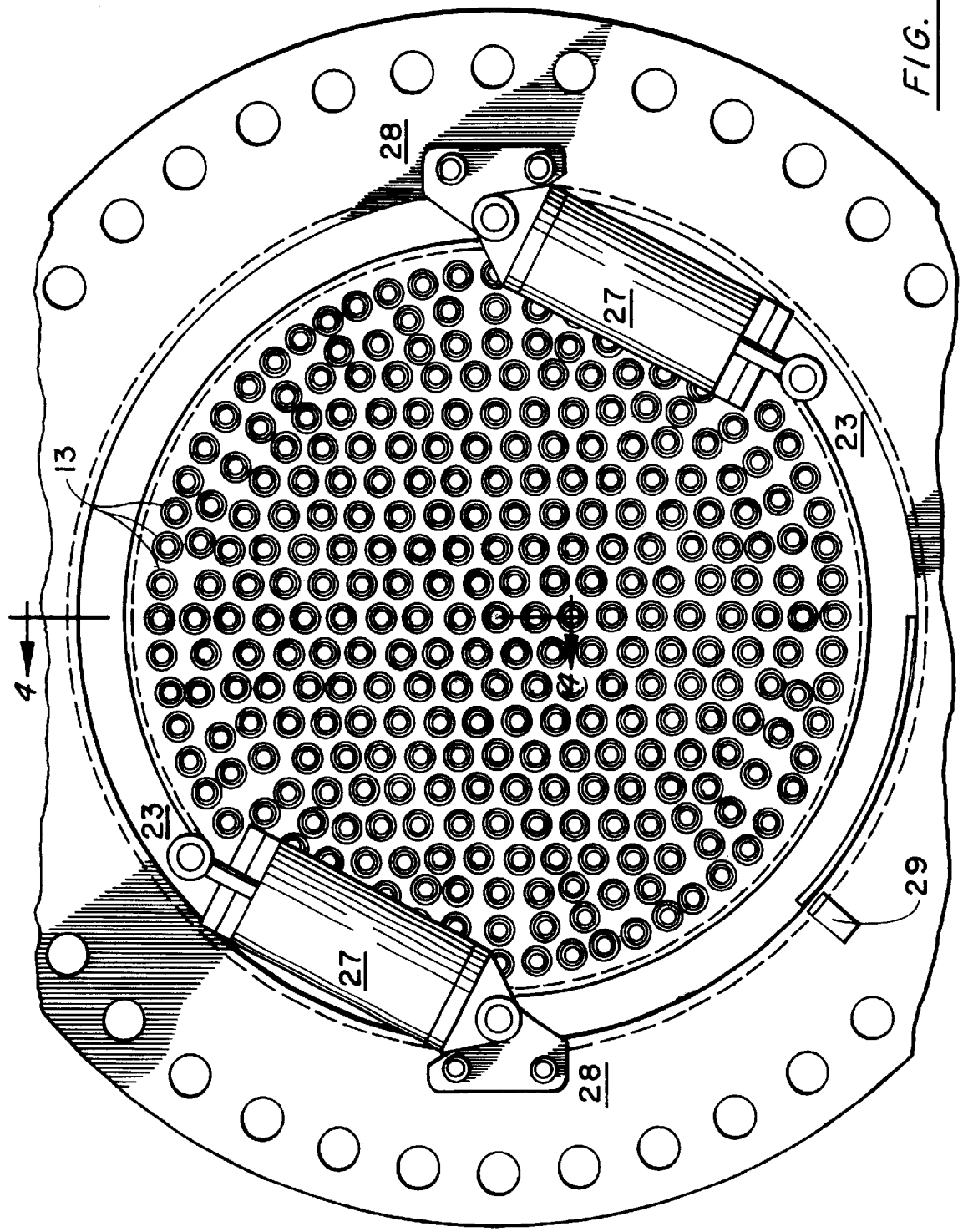
FIG. 3 shows the present invention after the positioning ring has been rotated by the actuators.

The width of the channel 21 is slightly greater than the thickness of the annular flange 22 such that when the second member 20 is secured to the first member 19, the annular flange 22 is free to slide within the annular channel 21 of the positioning plate 18. The outer diameter 24 of the positioning ring 23 is threaded to the inner surface 25 of the oxidizer chamber 11 by large pitch threads 26. One or more actuators 27 are pivotably mounted to an internal wall 28 of the oxidizer housing 14 and the positioning ring 23, as shown in FIGS. 1 and 3, to selectively rotate the positioning ring 23 with respect to the oxidizer housing wall 28. A transducer 29 is mounted to the oxidizer housing wall 28 to determine the rotational position of the positioning ring 23 relative to the oxidizer housing wall 28.

Although the actuators 27 could be mounted outside of the oxidizer chamber 11 and extending through the wall thereof to rotate the positioning ring 23, by locating the actuators 27 entirely within the oxidizer chamber, the need for sliding seals to contain very high pressure oxidizer is eliminated. Actuator fluid, preferably the oxidizer, can be fed to the actuators 27 through tubes extending through the oxidizer chamber wall, tubes which remain static as the actuators 27 are operated. Thus a simple seal can be used to provide the high pressure seal between the tubes and the oxidizer chamber wall.

In operation, at maximum oxidizer flow the sleeves are positioned along the injector tubes 13 so as not to impede the flow of oxidizer into the injector inlets 16 as shown in FIG. 2. In order to throttle down oxidizer flow, the actuators 27 rotate the positioning ring 23, thereby causing the positioning ring 23 and annular flange 22 to move axially along the injector tubes 13. Since the annular flange 22 is free to slide within the annular channel 21, the rotation of the positioning ring 23 is not transmitted to the positioning plate 18, consequently, only the axial movement of the positioning ring 23 is transmitted to the positioning plate 18, thereby simultaneously positioning the sleeves 17 over the injector inlets 16 to reduce oxidizer flow as desired as shown in FIG. 4.

As those skilled in the art will readily appreciate, the pitch of the threads 26 must be such that the rotation of the positioning ring 23 by the actuators 27 produces sufficient axial movement of the positioning plate 18 to move the sleeves 17 between a first position in which the sleeve 17 prevents the flow of oxidizer through the injector inlet 16 and a second position in which the flow of oxidizer through the injector inlet 16 is substantially unimpeded by the sleeve 17.

Although this invention has been shown and described with respect to detailed embodiments thereof, it will be understood by those skilled in the art that various changes in form and detail thereof may be made without departing from the original spirit and scope of the claimed invention.

I claim:

1. A throttleable injector assembly for a rocket which delivers oxidizer to a combustion chamber from an oxidizer chamber within an oxidizer housing, said injector assembly comprising:

a plurality of injector tubes mounted in and extending through the oxidizer housing, each tube having a first end in the oxidizer chamber, at least one oxidizer inlet adjacent the first end extending axially along the injector tube, the inlet communicating with an interior passage of the injector tube, and an oxidizer outlet in the combustion chamber, the interior passage extending from the oxidizer inlet to the oxidizer outlet and communicating therewith;

a positioning plate slidably receiving each injector tube adjacent the first end thereof, said positioning plate comprising a first member, a second member secured to the first member, and a plurality of sleeves fixedly secured between the first and second members, each of the injector tubes is slidably received within one of the sleeves of the positioning plate, and the positioning plate is selectively positionable axially along the injector tube between a first position in which the plate prevents flow of oxidizer through the inlets, and a second position in which the flow of oxidizer through the inlets is substantially unimpeded by the plate; and, means for selectively positioning the positioning plate axially along the injector tubes.

2. The injector assembly of claim 1 wherein the means for selectively positioning the positioning plate is located within the oxidizer housing.

3. The injector assembly of claim 2 wherein the means for selectively positioning the positioning plate comprise a positioning ring having a first set of threads which mesh with a second set of threads on an inner surface of the oxidizer housing, and means for rotating the positioning ring with respect to the oxidizer housing, wherein the positioning plate is rotatably received within the positioning ring by a flange extending therefrom slideably secured within a channel of the positioning plate, and rotation of the positioning ring with respect to the oxidizer housing displaces the plate and the sleeves mounted therein axially along the injector tubes in unison.

4. The injector assembly of claim 3 wherein the means for rotating the positioning ring comprise at least one actuator mounted to the oxidizer housing and pivotably connected to the positioning ring.

5. The injector assembly of claim 4 further comprising means for determining the rotational position of the positioning ring relative to the oxidizer housing mounted thereto.

6. A throttleable injector assembly for a rocket which delivers oxidizer to a combustion chamber from an oxidizer chamber within an oxidizer housing, said injector assembly comprising:

a plurality of injector tubes mounted in and extending through the oxidizer housing, each tube having a first end in the oxidizer chamber, at least one oxidizer inlet adjacent the first end extending axially along the injector tube, the inlet communicating with an interior passage of the injector tube, and an oxidizer outlet in the combustion chamber, the interior passage extending from the oxidizer inlet to the oxidizer outlet and communicating therewith;

a positioning plate slidably receiving each injector tube adjacent the first end thereof, the positioning plate selectively positionable axially along the injector tube between a first position in which the plate prevents flow of oxidizer through the inlets, and a second position in which the flow of oxidizer through the inlets is substantially unimpeded by the plate; and, means for selectively positioning the positioning plate axially along the injector tubes, said means located within the oxidizer housing and comprising a positioning ring having a first set of threads which mesh with a second set of threads on an inner surface of the oxidizer housing, and at least one actuator mounted to the oxidizer housing within the oxidizer chamber and pivotably connected to the positioning ring for rotating the positioning ring with respect to the oxidizer housing;

wherein the positioning plate is rotatably received within the positioning ring by a flange extending therefrom slidably secured within a channel of the positioning plate, and rotation of the positioning ring with respect to the oxidizer housing displaces the positioning plate axially along the injector tubes.

7. The injector assembly of claim 6 further comprising means for determining the rotational position of the positioning ring relative to the oxidizer housing mounted thereto.

* * * * *